(12) United States Patent
Horie (10) Patent No.: US 6,269,420 B1
(45) Date of Patent: Jul. 31, 2001

(54) INFORMATION RECORDING/ REPRODUCING APPARATUS REDUCING DISK ACCESS FREQUENCY TO FILE MANAGEMENT AREA AND SHARPLY ACCELERATING RECORD PROCESSING AND REPRODUCTION PROCESSING

(75) Inventor: Yuji Horie, Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/207,348

(22) Filed: Dec. 8, 1998

(30) Foreign Application Priority Data

Dec. 12, 1997 (JP) .................................... 9-343307

(51) Int. Cl.[7] ............................ G06F 12/00; G06F 11/30; G11C 17/00
(52) U.S. Cl. ...................... 711/103; 365/185.29; 713/200
(58) Field of Search ............................ 382/317; 711/103; 713/200; 365/185.29; 380/70; 707/531; 345/473

(56) References Cited

U.S. PATENT DOCUMENTS

| | | | | |
|---|---|---|---|---|
| 5,933,847 | * | 8/2000 | Ogawa ................................. | 711/103 |
| 6,072,918 | * | 6/2000 | Sasaki et al. ........................ | 382/317 |
| 6,094,723 | * | 7/2000 | Otsuka ................................ | 713/200 |

FOREIGN PATENT DOCUMENTS

| | | | |
|---|---|---|---|
| 8110868 | 4/1996 | (JP) . | |
| 09034791 | * 2/1997 | (JP) | ............................... G06F/12/12 |

* cited by examiner

Primary Examiner—Daniel H. Pan
Assistant Examiner—Te Yu Chen
(74) Attorney, Agent, or Firm—Ostrolenk, Faber, Gerb & Soffen, LLP (57) ABSTRACT

An information recording/reproducing apparatus that is an magneto-optical disk drive apparatus includes a disk controller that is connected to a SCSI controller and controls data transfer from/to a disk rotated by a spindle motor a cache memory temporarily storing data read from and written to the disk, a CPU controlling operation of respective blocks of the apparatus, a program storage that has an analyzing block for analyzing a file management area in the disk, and stores that operational programs for the CPU, and a read/write controller controlling record/reproduction of data to/from the disk. In this construction, since a part of D file management area in the disk is cached all the time at the time of read, data through a plurality of read from operations the boot sector, FAT1, and root directory are sent respectively from the cache memory without accessing the disk. Similarly, although a plurality of write operations are performed respectively to the FAT1, FAT2, and root directory, this plurality of write operation are performed only once with respect to the disk after termination of all the commands.

6 Claims, 11 Drawing Sheets

INFORMATION RECORDING/REPRODUCING APPARATUS REDUCING DISK ACCESS FREQUENCY TO FILE MANAGEMENT AREA AND SHARPLY ACCELERATING RECORD PROCESSING AND REPRODUCTION PROCESSING

BACKGROUND OF THE INVENTION

1. Field of the Invention

The present invention relates to an information recording/reproducing apparatus and an information recording/reproducing method, and in particular, to an information recording/reproducing apparatus that is characterized in a cache control block in a file management area.

2. Related Art Statement

Generally, an information recording/reproducing apparatus such as an optical disk apparatus is used as an external storage in an information processing apparatus. Nevertheless, write processing and read processing to/from a recording medium is slower than the data transfer speed between a host computer and the information recording/reproducing apparatus. Therefore, recently, it has become common to use an information recording/reproducing apparatus that accelerates record processing and reproduction processing of data by providing cache memory in between and performing data transfer through this cache memory. In particular, in an optical disk apparatus using an optical disk as a recording medium, it is common to provide disk cache memory for temporarily storing record data and reproduction data because it needs much time to perform write processing to the recording medium.

In conventional information recording/reproducing apparatuses such as an optical disk, for as example, in Japanese Unexamined Patent Publication No. 8-110868, some information recording/reproducing apparatuses each store a position and length of a file management area, most frequently accessed by a host computer so as all the time in cache memory after the host computer designates the position and length of the file management area at the time of initialization.

The above-described Japanese Unexamined Patent Publication No. 8-110868, however, discloses a file management table transfer means which reads a file management table from any area among a plurality of areas on a recording medium at the time of initialization and transfers the table to a file management table storage area on a cache buffer. Nevertheless, the publication does not disclose a method of setting the quantity, positions, and length of the file management area.

Thus, in the invention disclosed in the Japanese Unexamined Patent Publication No. 8-110868, the file management area cannot be cached all the time without the host computer designating the position and length of the file management area. Therefore, the invention is problematic in that both the host computer (in general, software called a device driver controls recording/reproducing operation) and the information recording/reproducing apparatus each should have a function for caching the file management area all the time. Hence, it is necessary to use a special device driver for this purpose.

OBJECT AND SUMMARY OF THE INVENTION

An object of the present invention is to provide an information recording/reproducing apparatus that reduces disk access frequency to a file management area at the time of creation, deletion, and modification of a file by analyzing a logical format of a disk and caching the file management area all the time and the can sharply accelerate record processing and reproduction processing.

An information recording/reproducing apparatus of the present invention comprises cache memory that not only temporarily stores at least a part of the recorded information from an external host computer recording management data per file onto a recording medium having a file management area for storing the management data per file before recording the part of the recorded information onto the recording medium, but also temporarily stores at least a part of the reproduced information from the recording medium before sending the information, and a controller that has an analyzing block for analyzing at least a part of the information stored in the cache memory and controls record/reproduction of information to/from the recording medium. Furthermore, the controller identifies a format of the recording medium on the basis of the analysis result by the analyzing block, determines a position of the file management area, and caches at least a part of the file management area all the time in the cache memory. Therefore, the information recording/reproducing apparatus makes it possible to reduce disk access frequency to a file management area at the time of creation, deletion, and modification of a file and can sharply accelerate record processing and reproduction processing.

Other features and advantages of the present invention will become apparent with the following description.

BRIEF DESCRIPTION OF THE DRAWINGS

FIGS. 1 through 11 relate to a first embodiment of the present invention:

DESCRIPTION OF THE PREFERRED EMBODIMENT

In an embodiment of the present invention that is described below, a configured example of a magneto-optical disk drive apparatus performing record/reproduction using a magneto-optical disk is shown as an example of an information recording/reproducing apparatus. Nevertheless, the present invention is not limited to this, but can be applied also to information recording/reproducing apparatuses such as a hard disk apparatus, a phase change type of optical disk apparatus, a floppy disk apparatus, and an optical card.

Construction

Figure 1:
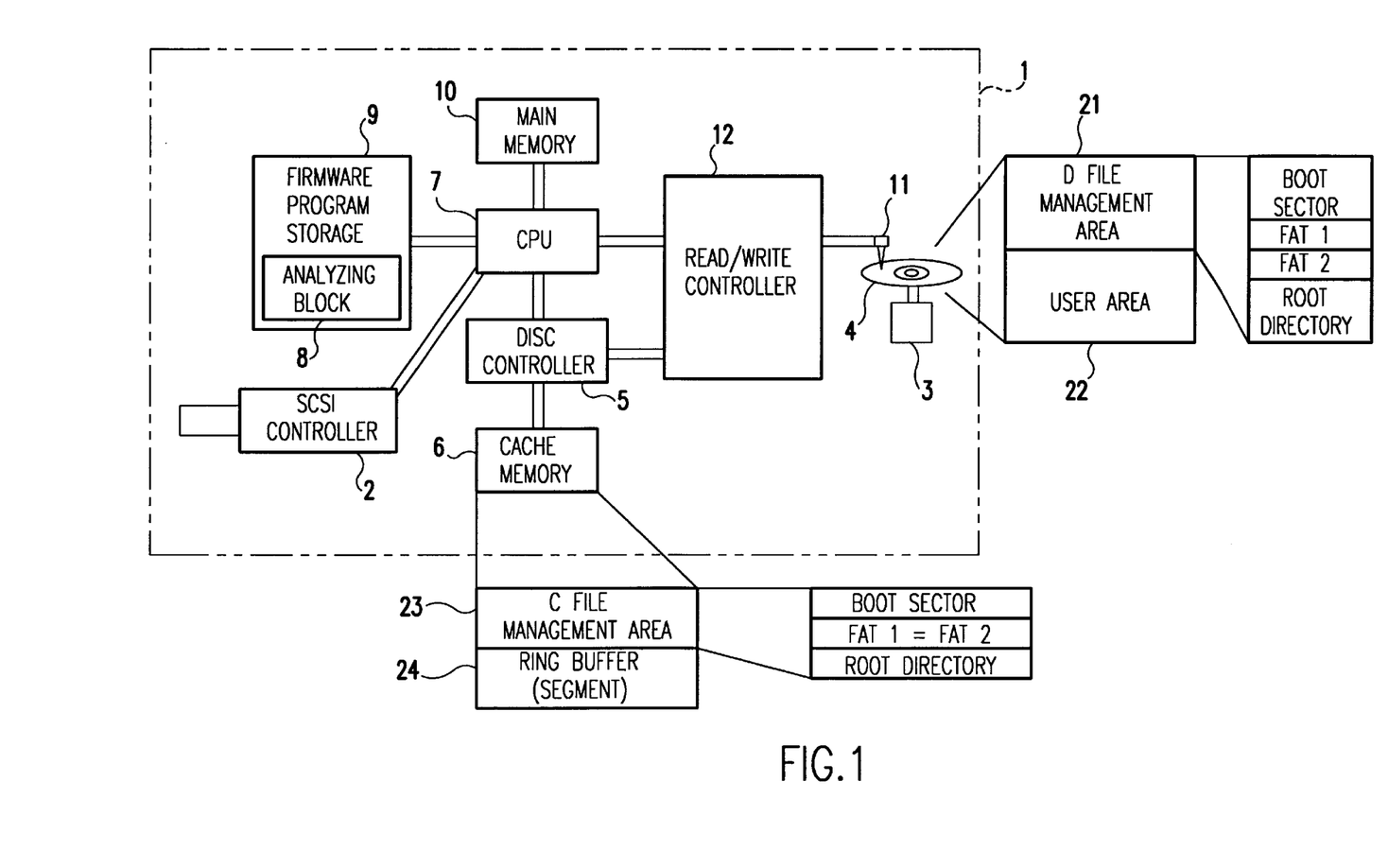
FIG. 1 is a configuration showing the construction of an information recording/reproducing apparatus according to the present invention.

An information recording/reproducing apparatus 1 that is a magneto-optical disk drive apparatus, as shown in FIG. 1, includes an SCSI controller 2 which is connected to a host computer through an interface cable and which controls transfer of commands and data under the SCSI protocol (protocol control), a disk controller 5 which is connected to the SCSI controller 2 and which controls transfer of data from/to a disk 4 serving as a recording medium rotated by a spindle motor 3 cache memory 6 which temporarily stores data read from and written to the disk 4, a CPU 7 which control operation of respective blocks of the apparatus, a firmware program storage 9 which has an analyzing block 8 for analyzing a file management area in the disk 4 and which stores operational programs for the CPU 7, main memory 10 which a working area for storing data and the like at the time of the CPU 7 operating, and a read/write controller 12 controls a recording/reproducing head 11 for performing record/reproduction of data to/from the disk 4.

Here, the disk 4 is physically formatted, for example, in 512 bytes/sector, and capacity of the cache memory 6 is, for example, 1 MB=800H blocks (=sectors) to be used as a ring buffer.

In addition, in this embodiment, a process in the disk 4 is logically formatted in a FAT (File Allocation Table, see below) mode where management data such as a file name, a file number, an address, and the number of sectors is managed with a file management table (hereinafter, this is called a FAT File Allocation Table) will be described.

In the disk 4 logically formatted in the FAT mode, respective areas a D file management area 21 composed of a boot sector, a FAT1, a FAT2, and a root directory, and a user area 22 are provided. In addition, the cache memory 6 is composed of respective areas, a C file management area 23, composed of a boot sector, a FAT1 (=FAT2), and a root directory, and a ring buffer 24.

Operation

Figure 2:
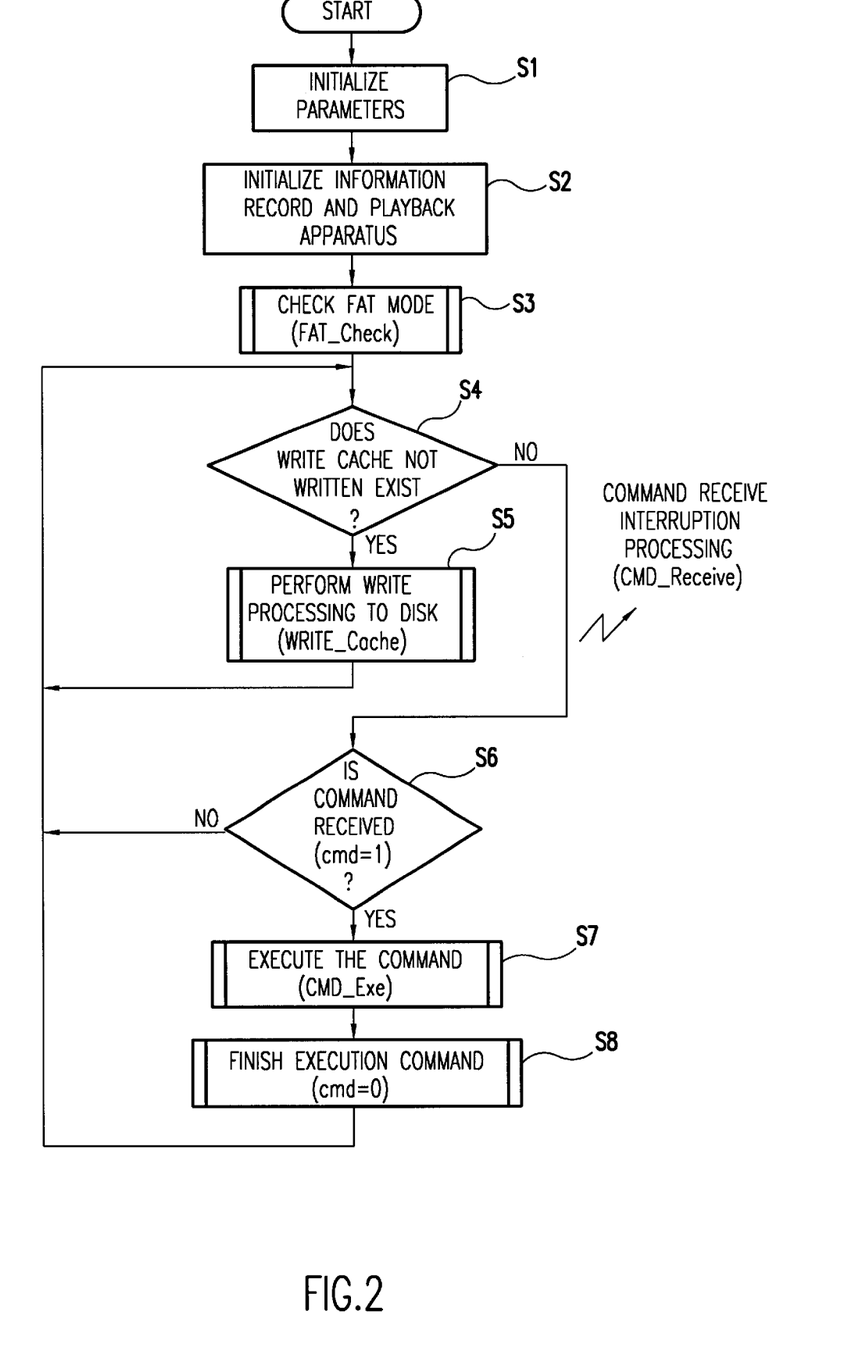
FIG. 2 is a flow chart showing a flow of main processing in a CPU as shown in FIG. 1.

According to the operation program stored in the firmware program storage 9, the CPU 7, as shown in FIG. 2, first initializes respective parameter values used for control at step S1. Furthermore, the CPU 7 initializes the apparatus (rotatably drives the spindle motor 3 and enables the head 11 to perform record/reproduction to/from the disk 4) at step S2.

Then, at step S3, the CPU 7 checks whether the format of the disk 4 is in the FAT mode (FAT_Check).

After that, at step S4, the CPU 7 checks whether write cache not written exists in the ring buffer 24, and, if such cache exists, the CPU 7 performs write processing to the disk 4 (Write_Cache) at step S5.

Here, it is possible to receive a command from the host computer during the loop from the step S4 to the step S6 in the drawing, whereupon the CPU 7 performs command receive interruption processing (CMD_Receive).

If the write cache not written is not found exist at the step S4, the CPU 7 checks at step S6 whether a command has been received (whether the flag cmd is 1). If command is received and has yet to be executed, the CPU 7 performs command execution processing (CMD_Exe) at step S7. Thereafter, the CPU 7 terminates the command and clears the flag (cmd=0) at step S8, and returns to the step S4 and repeats processing.

Figure 3:
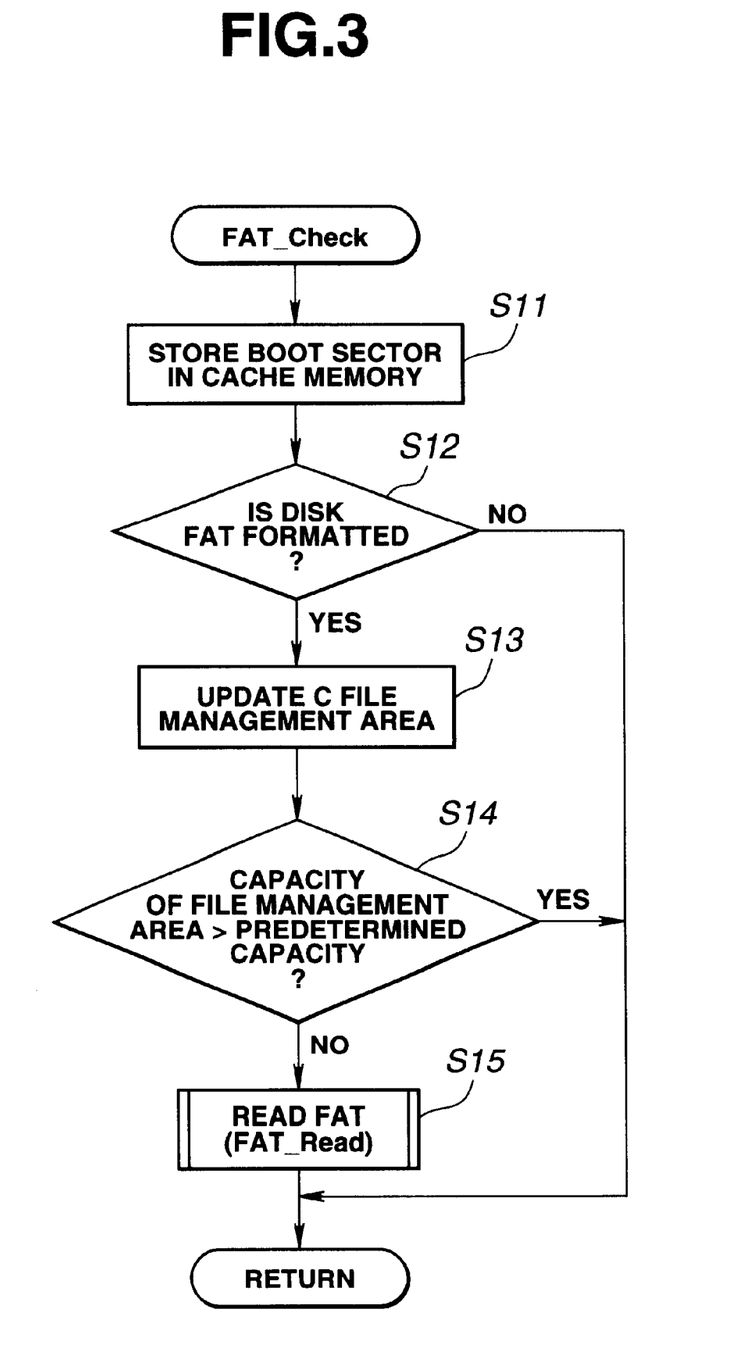
FIG. 3 is a flow chart showing a flow of FAT__Check processing in FIG. 2.

In the procedure of checking for whether the format in the FAT mode in FAT_Check at step S3, as shown in FIG. 3, the boot sector of the D file management area 21 is first read and is stored at step S11 in a leading part of the cache memory.

Then, by analyzing the boot sector at step S12 using the program for the analyzing block of the firmware program storage 9, the CPU 7 judges whether the boot sector is a boot sector in the FAT mode, that is, whether the disk 4 is formatted in the FAT mode. If the disk 4 is not formatted in the FAT mode, the processing is terminated.

If the CPU 7 judges that the disk 4 is formatted in the FAT mode, the CPU 7 obtains at step S13 the number of FATs in the D file management area 21 (two in this embodiment), and addresses and of the FAT1 FAT2, and root directory from the boot sector data to update the C file management area 23 of the cache memory 6.

In order to prevent not securing the ring buffer (segment) 24 for performing record/reproduction of the user area 22 at high-speed because the C file management area 23 occupies the majority of the cache memory 6, the CPU 7 checks at step S14 whether the D file management area 21 is not less than a predetermined capacity. If the area 21 is not less than the predetermined capacity, the processing is suspended and if the area is less than the predetermined capacity, FAT read processing (FAT_Read) is performed at step S15, and the process is returned to step S4 in FIG. 2.

Figure 4:
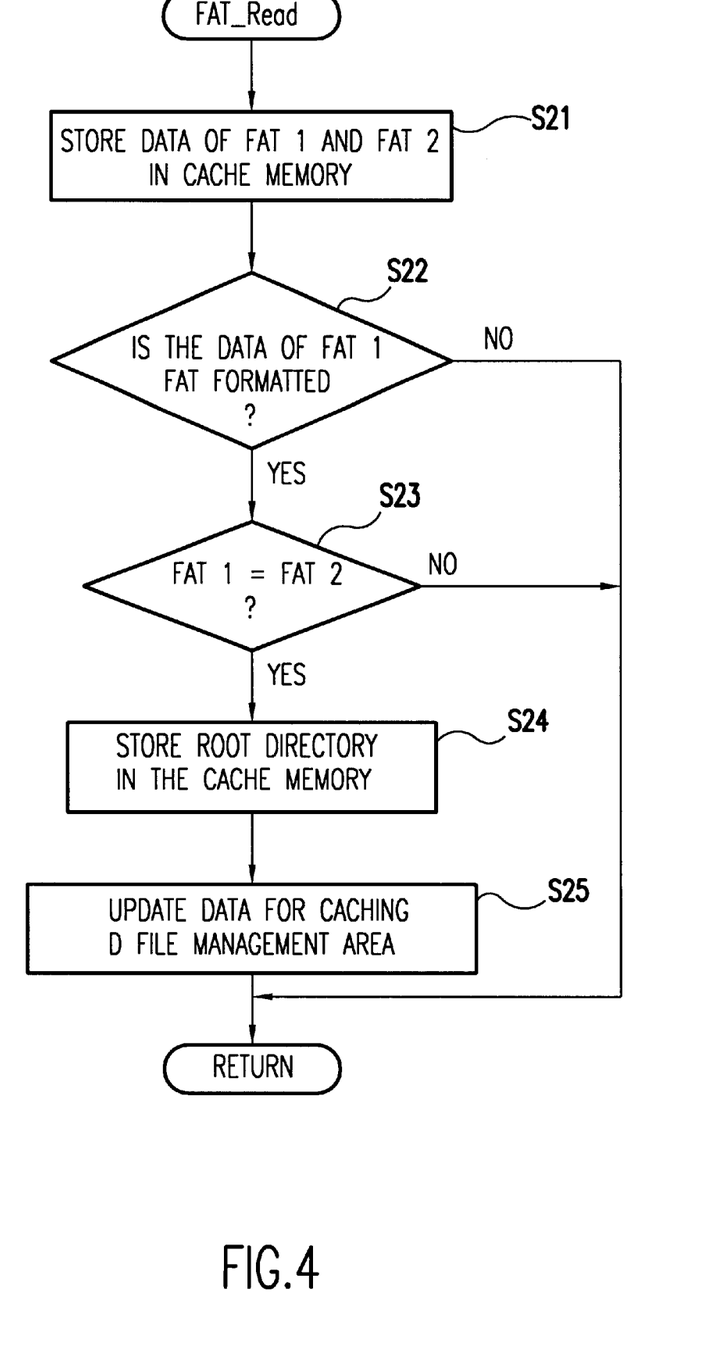
FIG. 4 is a flow chart showing a flow of FAT__Read processing in FIG. 3.

FAT_Read at step S15, as shown in FIG. 4, reads data of the FAT1 and FAT2 of the D file management area 21 at step S21, and stores the data in the address following the data of the boot sector in the C file management area 23.

Then, the CPU 7 judges at step S22 whether the FAT1 in the D file management area 21 is in the FAT format, and, if the FAT1 is not, the process is terminated. If the FAT1 is in the FAT format, the CPU 7 checks at step S23 whether the FAT1 and FAT2 (copy of the FAT1) coincide with each other.

Processing at step S23 is process for caching only the FAT1 all the time in the cache memory 6 while assuming in the cache control of this embodiment in the FAT mode that the FAT1 and FAT2 are equal and for performing write to/read from the FAT1 instead of write to/read from the FAT2.

If the FAT1 and FAT2 do not coincide with each other at S23, the process does not move to the cache control in the FAT mode since it cannot be judged which of the FAT1 or FAT2 is correct except the last write being an abend.

If the FAT1 and FAT2 coincide at the step S23, it can be seen that the disk 4 is formatted in the FAT mode and the FAT1 and FAT2 coincide with each other. Therefore, the root directory of the D file management area 21 is read at step S24 and is stored in the address following the FAT1 (=FAT2) of the C file management area 23 in the cache memory 6.

Then, at step S25, data for caching the D file management area 21 is updated and data (a leading address and length of the ring buffer 24, and an address of the cache memory 6 in the case of performing a first normal write cache) for making the ring buffer 24 of the cache memory 6 usable for normal write cache and read/write are updated. with these operation a part of the D file management area 21 (the boot sector, FAT1 (=FAT2), and root directory) is cached all the time. If the processing is suspended during the from step S11 to step S25, the entire cache memory 6 is used as the ring buffer 24.

In addition, although the boot sector, FAT1 (=FAT2), and root directory are stored in the D file management area 21 in the disk 4, the used amount of the cache memory is suppressed by performing the write to/read from the FAT1 instead of the write to/read from the FAT2. This is because the FAT2 is a copy of the FAT1. Furthermore, although a subdirectory is provided in the D file management area 21, the subdirectory is not cached all the time in this embodiment. This is because it is impossible to simply specify a position from the boot sector, FAT1, and root directory since the subdirectory is generated every time a user generates a directory and is not generated in a position continuous to other parts.

Figure 5:
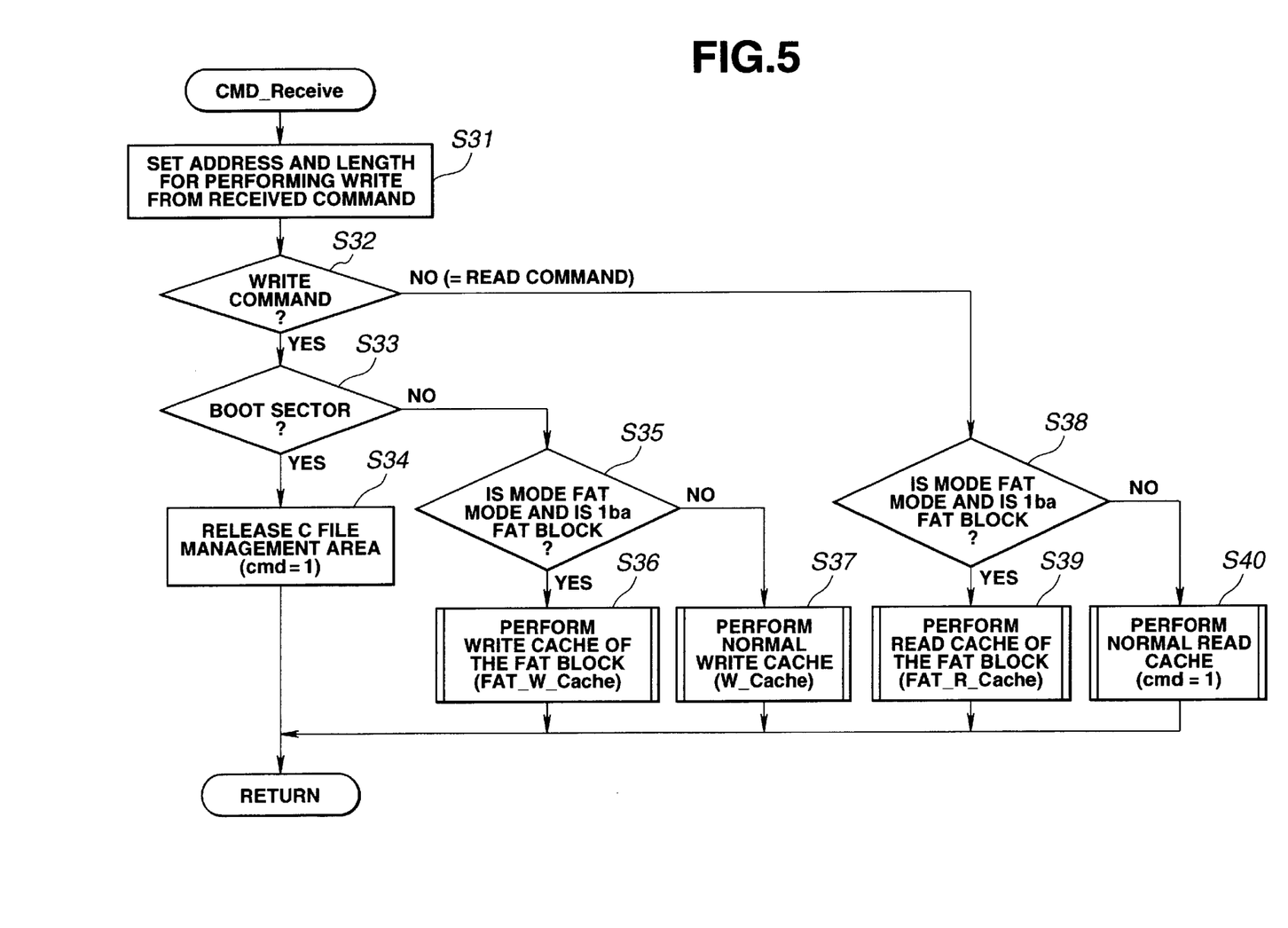
FIG. 5 is a flow chart showing a flow of CMD__Receive processing in FIG. 2.

As for the command receive interruption processing (CMD_Receive) at the time of receiving a command from the host computer during the loop from the step S4 to step S6 in FIG. 2, as shown in FIG. 5, first an address (hereinafter, called lba (logical block address)) and the number of blocks (hereinafter, called length (data length)) are first set from the command sent from the host computer at step S31.

Next, it is checked at step S32 whether the received command is a write command and, if it is, so checked at step S33 whether the lba is zero. The lba is zero, the data is for the boot sector. Therefore, at step S34, the FAT mode is stopped, the C file management area 23 is released, the set values are changed from the values in the FAT mode to values in the normal mode, and the flag showing that a command has been received is set (cmd=1).

When this command receive flag (cmd) is set, as Illustrated in FIG. 2, the command received signal is recognized at step S6, the command execution processing (CMD_Exe) is performed at step S7, and the command receive flag (cmd) is cleared at step S8.

The process then returns to FIG. 5. If it is recognized at step S33 that the lba is not zero, it is checked at step S35 whether the mode is the FAT mode and whether the lba is within the area continuing from the address where lba=0, that is, the boot sector, FAT1, FAT2, and root directory (hereinafter, these are called a FAT block) of the D file management area 21 that is cached all the time.

If the lba shows the FAT block, write cache of the FAT block (FAT_W_Cache) is performed at step S36, and, if the mode is not the FAT mode or the lba shows an area other than the FAT block, normal write cache is performed at step S37 (W_Cache) command is not the write command, that is, the command is a read command, the CPU 7 checks at step S38 whether the mode is the FAT mode and whether the lba is within the range of the FAT block. Then, if the lba shows the FAT block, the CPU 7 returns the data at step S39 from the cache memory 6 to the host computer, that is, performs read cache of the FAT block (FAT_R_Cache). If the mode is not the FAT mode or the lba shows an area other FAT block at the step S38, the CPU 7 sets the command receive flag (cmd=1) for performing normal read from the disk 4 at step S40.

Figure 6:
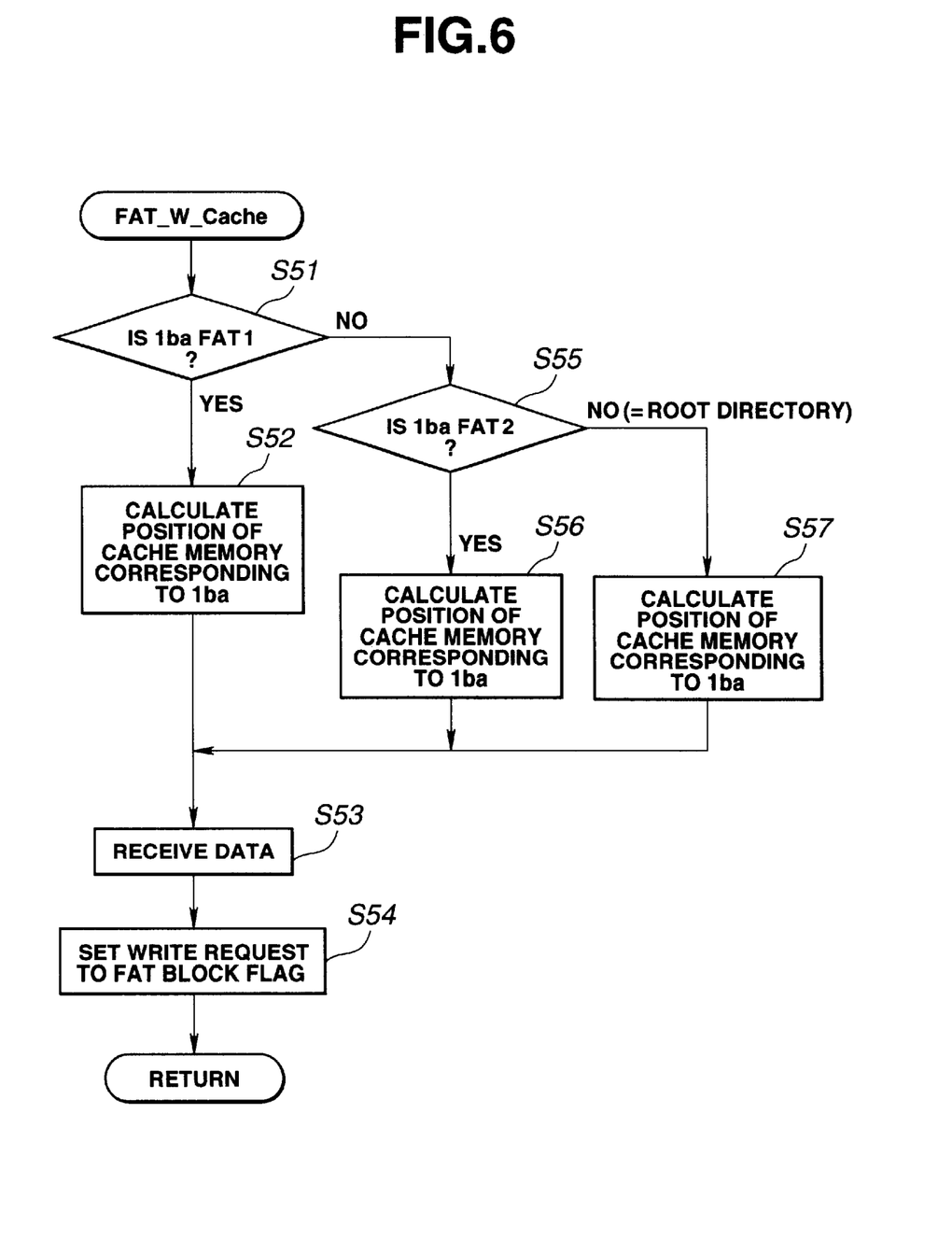
FIG. 6 is a flow chart showing a flow of FAT__W__Cache processing in FIG. 5.

In the FAT_W_Cache at step S36, as shown in FIG. 6, it is checked at step S51 whether the lba shows the FAT1. If the lba shows the FAT1, a position in the cache memory 6 where data corresponding to the specified lba is stored, is calculated at the step S52. Furthermore, at step S53, data is received from the host computer, and a flag for requesting write of the FAT block is set at step S54.

If the lba does not show the FAT1 at the step S51, it is checked at step S55 whether the lba shows the FAT2. If the lba shows the FAT2, a position in the cache memory 6 where data corresponding to the specified lba is stored, is calculated at step S56. Furthermore, at step S53, data is received from the host computer, and a flag for requesting write of FAT block is set at step S54.

If the lba does not show FAT2 at the step S55, the lba is judged to show the root directory. Then, a position in the cache memory 6 corresponding to the lba is calculated at step S57. Furthermore, at step S53, data is received from the host computer, and a flag for requesting write of the FAT block is set at step S54.

Figure 7:
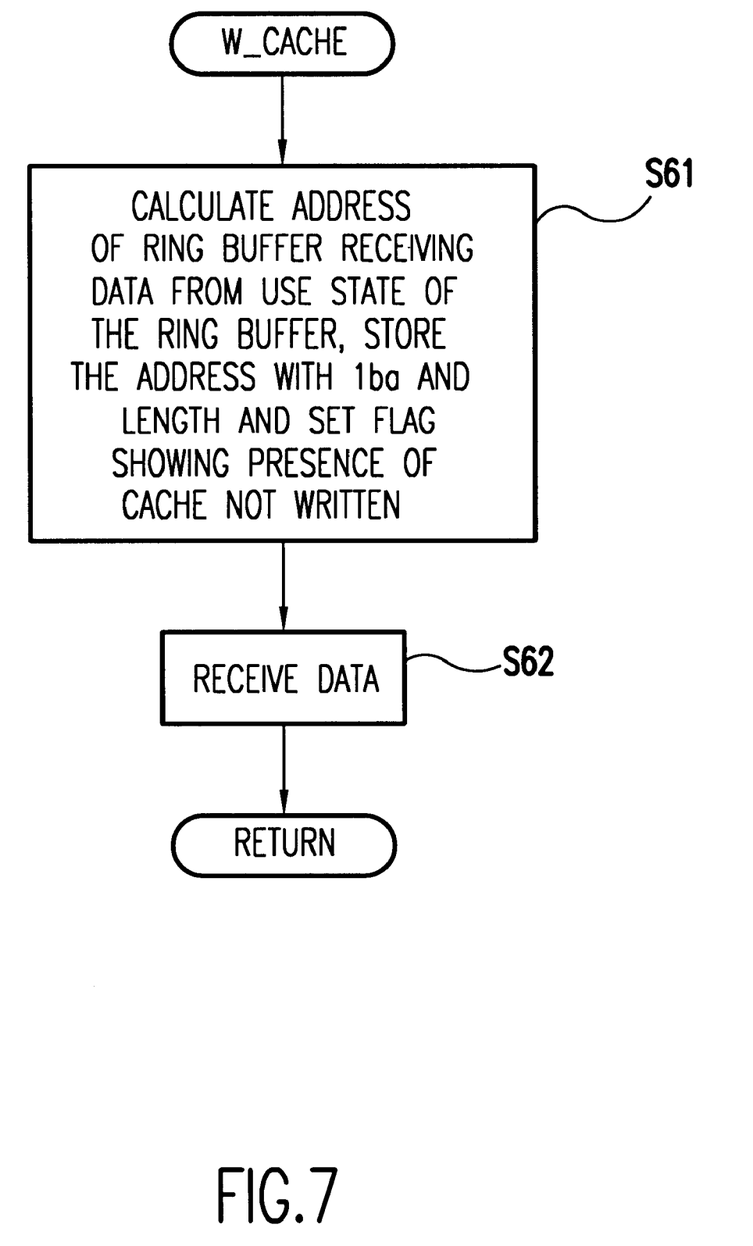
FIG. 7 is a flow chart showing a flow of W__Cache processing in FIG. 5.

For the normal write cache performed W_Cache at step S37 in FIG. 5 for an lba showing other then the FAT block that is cached all the time, as shown in FIG. 7, the address of the ring buffer 24 receiving data is first calculated from a use state of the ring buffer 24 at step S61, and is stored with the lba and length. Then, a flag showing the presence of the cache not written is set. Furthermore, at step S62, data is received from the host computer.

Figure 8:
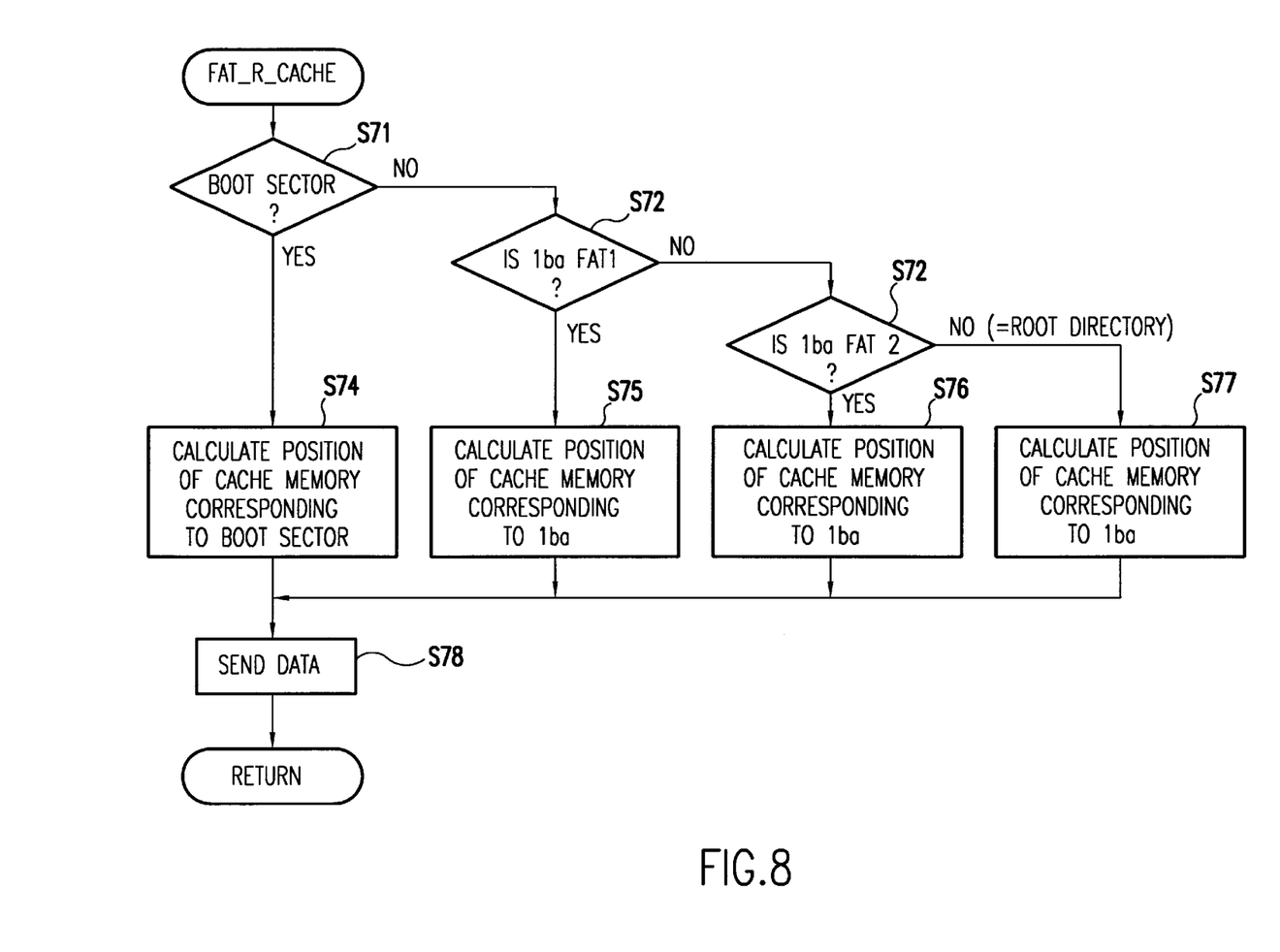
FIG. 8 is a flow chart showing a flow of FAT__R__Cache processing in FIG. 5.

FAT_R_Cache in the read cache performed at step S39 in FIG. 5 of the FAT block that is cached all the time, as shown in FIG. 8, is it is checked at step S71 whether the lba shows the boot sector. If not, it is checked at step S72 whether the lba shows the FAT1 and, if not the FAT1, it is checked at step S73 whether the lba shows the FAT2 or the root directory.

Each position in the cache memory 6 is calculated at step S74 if the lba shows the boot sector at step S71, at step S75 if the lba shows the FAT1 at step S72, at step S76 if the lba shows the FAT2 at step S73, or at step S77 if the lba shows the root directory at step S73. Furthermore, the data is sent to the host computer at step S78.

Figure 9:
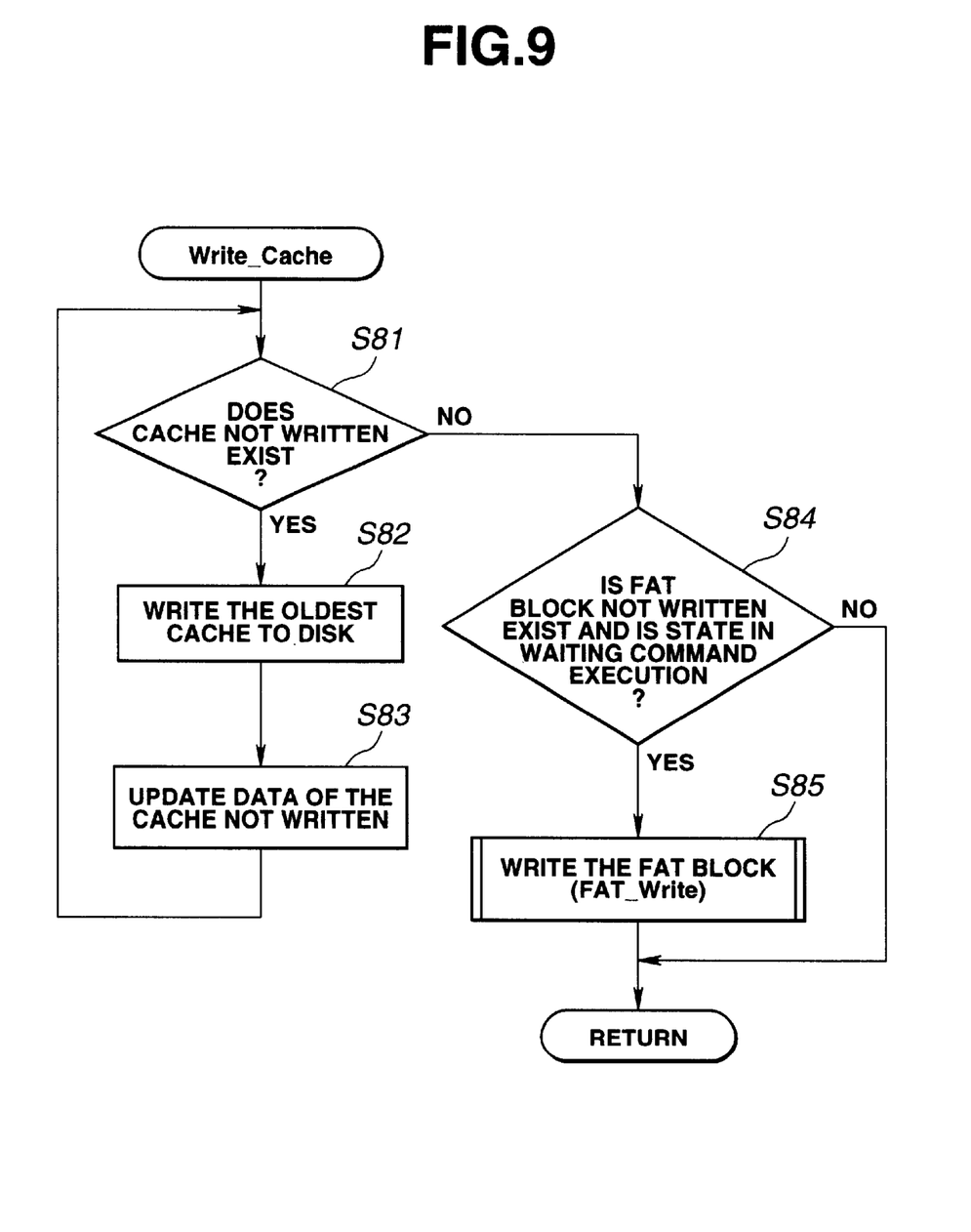
FIG. 9 is a flow chart showing a flow of Write__Cache processing in FIG. 2.

As for the normal cache and Write_Cache performed at step S5 in FIG. 2 that writes to the disk 4 the FAT block which is cached all the time, as shown in FIG. 9, it is checked at step S81 in the normal write cache whether cache not written in the disk 4 exists. If any normal write cache not written exists, the oldest cache is written to the disk 4 at step S82. Then, the data in the cache not written is updated at step S83, and operation of these steps S81 through S83 is repeated until cache not written does not exist.

If it is judged at step S81 that the normal write cache not written does not exist, it is checked at step S84 whether the FAT block is not written (the FAT-block-write-request flag is set) and whether the state is not the command received state (the state of waiting execution) (including the state of awaiting execution of the write-to-boot-sector command). If the FAT block is not written and the state is not the command received state, write processing to the FAT block of the D file management area 21 on the disk 4 (FAT_Write) is performed at step S85.

In this embodiment, although the not-written/written states are managed by putting together the FAT1, FAT2, and root directory in the FAT block the write operation to the disk 4 is separately performed.

Figure 10:
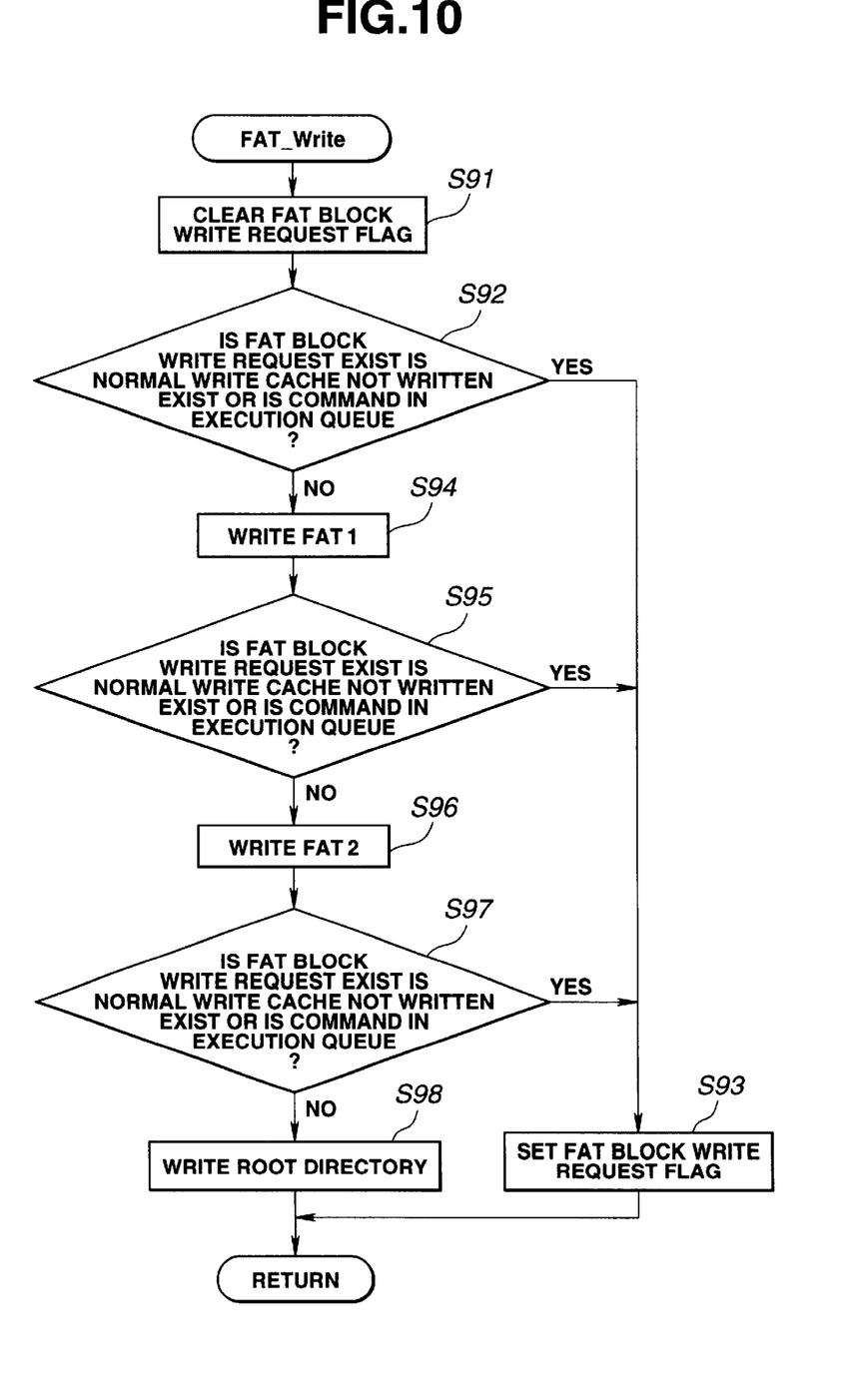
FIG. 10 is a flow chart showing a flow of FAT__Write processing in FIG. 9.

Then, as for the FAT_Write at step S85, as shown in FIG. 10, a FAT-block-write-request flag is first cleared at step S91. Furthermore, it is checked at step S92 whether write cache of the FAT block is performed (whether FAT-block-write request exists), whether normal write cache not written exists, and whether a command is in the execution queue. If any one of these condition exists, write of the FAT block is suspended, the FAT-block-write-request flag is set at step S93, and processing is terminated. If none of the above list condition exists, the FAT1 is written to the disk 4 at step S94.

Similarly, it is checked at step S95 before write writing of the FAT2 whether the write cache of the FAT block is performed (whether FAT-block-write request exists), whether normal write cache not written exists, and a command is in the execution queue. If any one of these condition exists, write of the FAT block is suspended, the FAT-block-write-request flag is set at the step S93, and processing is terminated. If none of these condition exists, FAT2 is written to the disk 4 at step S96.

Furthermore, similarly, it is checked at step S97 before writing of the root directory whether the write cache of the FAT block is performed (whether FAT-block-write request exists), whether normal write cache not written exists, and whether a command is in the execution queue. If any one of these condition exists, write of the FAT block is suspended, the FAT-block-write-request flag is set at step S93, and processing is terminated. If none of these exists the root directory is written to the disk 4 at step S98.

Usually, although writing is not suspended at the steps S92, S95, and S97, the processing time for creating a plurality of files may become long if the operation of the host computer is slow. Therefore, since execution of the FAT_Write is started before completion of creating all the files, the write may be suspended at steps S92, S95, and S97. In such case, it is recommended to wait for predetermined time from the execution of last command to start of the to FAT_Write.

Figure 11:
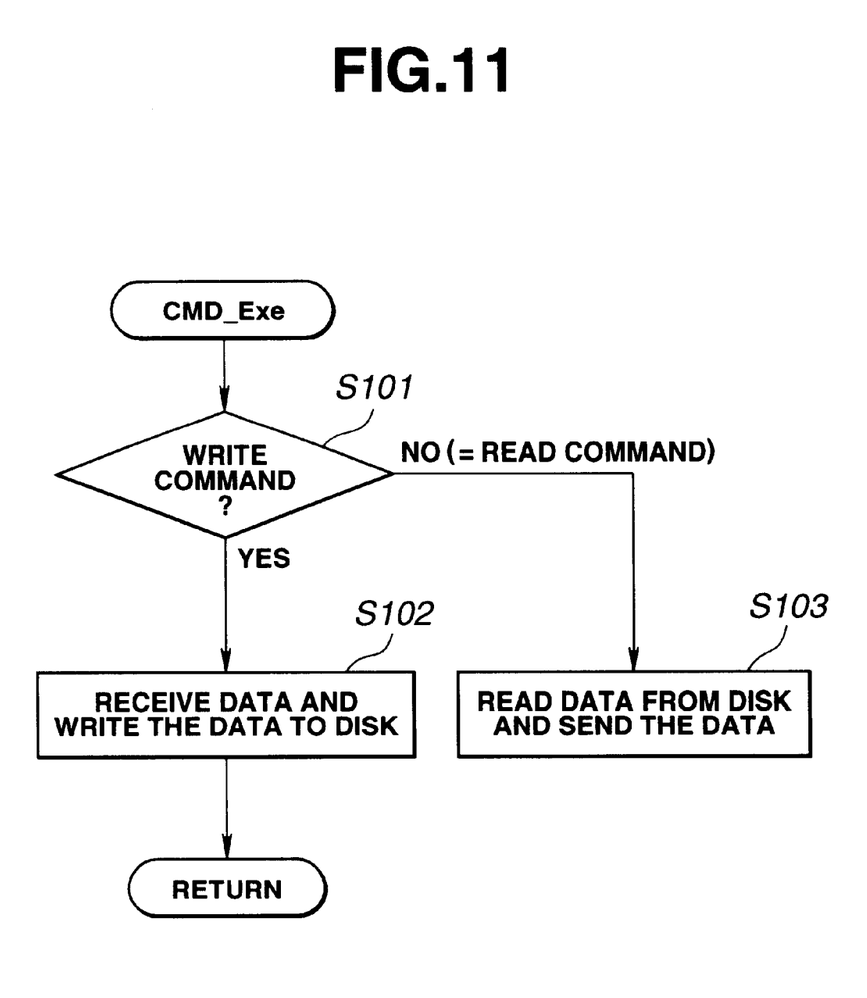
FIG. 11 is a flow chart showing a flow of CMD__Exe processing in FIG. 2.

Finally, command execution processing (CMD_Exe) at step S7 in FIG. 2 will be described. As for the CMD_Exe, as shown in FIG. 11, it is checked at step S101 whether the command is the write command, and if it is the write command, data is from the host computer and written to the disk at step S102. If, in the case of writing to the boot sector, FAT mode check (FAT_Check in FIG. 3) is executed after completion of write operation the mode can move to the as FAT mode if it is logically formatted in the FAT mode again. If the command in is not a write command at the step S101, that is, read command, data is read from the disk and is transmitted to the host computer at step S103.

By means of the above processing, in the case of writing to the disk 4, first, the CPU 7 controls the head 11 to access the lba to be written. After that, the CPU 7 controls the read/write controller 12 to modulate the data stored in the cache memory 6 into data, which can be written to the disk 4, and write the data to the disk 4. In addition, in the case of a read operation from the disk 4, first, the CPU 7 controls the head 11 to access to the lba to be read. After that, the CPU 7 controls the read/write controller 12 to make the controller 12 demodulate the data read from the disk 4 into the data sent to the host computer, and sends the data to the host computer.

Here, the case in which a plurality of files are copied from a hard disk HDD of the host computer to the root directory of the disk 4 in the recording/reproducing apparatus 1 will be described.

First, the host computer checks whether the disk 4 is formatted in the FAT format by executing a command to read the boot sector. This read command allows data to be transferred from the cache memory 6 by the FAT_R_Cache without accessing the disk 4.

Similarly, commands to read the FAT1, the FAT2, and the root directory allow data to be transferred from the cache memory 6 by the FAT_R_Cache without accessing the disk 4.

Next, the host computer executes a command to read the FAT1 so as to obtain the addresses for copying the files. After that, the host computer executes a command write the FAT1 without modifying the data read. This command to the FAT1 is terminated only after transferring the data to the cache memory 6 by the FAT_W_Cache. In addition, since the read commands and write commands, which are subsequently executed, are preferentially processed, writing the FAT1 to the disk 4 is not executed yet at this time.

Similarly, commands write the FAT1, the FAT2, and writing the root directory allow data to be transferred to the cache memory 6 by the FAT_W_Cache without accessing the disk 4, where upon the command execution is terminated. Since the read commands and write commands, which are subsequently executed, are preferentially processed, these commands are not executed until all the other commands are terminated.

Furthermore, the host computer reads the root directory and performs a wrote operation of the root directory by adding a first file information, so as to update the root directory.

After that, the host computer writes a first file to a user area 22 of the disk 4. Although this write command is terminated after only transferring the data by the W_Cache, the data is immediately written to the disk 4 by the Write_Cache.

Then, the host computer writes the FAT1 and FAT2 to which the first file information is added.

Until this time, access to the disk 4 has been performed only once at the time of writing the first file to the user area 22.

A second file is processed similarly.

When copying (read and write commands) of all the files is completed, the FAT1, FAT2, and root directory are written only once respectively by the FAT_Write. (Effects)

In this manner, in this embodiment, since a part of the D file management area 21 in the disk 4 is cached all the time at the time of a read operation, data through a plurality of read operation from the boot sector, FAT1, and root directory are sent respectively from the cache memory 6 without accessing the disk 4. Therefore, it becomes possible to perform read operation at high speed.

Similarly, although a plurality of write operation are performed respectively to the FAT1, FAT2, and root directory, this plurality of write operations performed only once with respect to the disk 4 after termination of all the commands. Hence it becomes possible to perform write operation at high speed.

In addition, the FAT_Check can be executed upon every disk exchange if the media of a recording/reproducing apparatus are exchangeable like those of a magneto-optical disk apparatus. Furthermore, the FAT_Check can be executed at the time of reading or writing of the file management area without being executed beforehand.

Moreover, although all the areas of the FAT1 and root directory are cached all the time in this embodiment, only a part of these areas can be cached all the time if only that part is used.

In addition, although the FAT format is described in this embodiment, the present invention can be applied to other formats such as (NTFS, HFS, HPFS, and the like).

It is apparent that a variety of different working modes can be formed on the basis of the present disclosure without departing from the spirit and scope of the present invention. The present invention is therefore not restricted by any specific embodiment discussed herein except being limited by the appended claims.

What is claimed is:

1. An information recording/reproducing apparatus comprising:
    a host computer for recording management information of a file on a recording medium having a file management area for storing the management information;
    a cache memory which temporarily stores at least a part of information to be recorded from the host computer, the cache memory temporarily storing at least part of the management information to be recorded before the management information is recorded on said recording medium, the cache memory also temporarily storing at least a part of information to be reproduced from said recording medium before the information to be reproduced is sent to said host computer: and
    a controller that has an analyzing block for analyzing at least a part of the information stored in said cache memory and which controls record/reproduction of information to/from said recording medium, wherein said controller identifies a format of said recording medium on the basis of an analysis result by said analyzing block, determines a position of said file management area, and caches at least a part of said file management area all the time in said cache memory, wherein if a plurality of said file management areas having the same contents exists on said recording medium, said controller compares the contents of the plurality of said file management areas with each other, and if all the contents coincide, said controller caches only one of said file management areas in said cache memory all the time.

2. The information recording/reproducing apparatus according to claim 1, wherein said controller suspends caching of said file management areas if writing of said file management areas to specific addresses occurs.

3. The information recording/reproducing apparatus according to claim 1, wherein said controller suspends caching of said file management areas if a capacity of said file management areas is not less than a predetermined capacity.

4. An information recording/reproducing method comprising:

temporarily storing in a cache memory at least a part of information to be recorded from an external host computer, the host computer recording management information of a file on a recording medium having a file management area for storing the management information, wherein at least part of the management information to be recorded is temporarily stored before the management information is recorded on said recording medium;

temporarily storing in said cache memory at least a part of information to be reproduced from said recording medium before the information to be reproduced is sent to said external host computer; and controlling the recording/reproducing of the management information by analyzing at least a part of the information stored in said cache memory;

identifying a format of said recording medium on the basis of an analysis result obtained in said analyzing step;

determining a position of said file management area; and caching at least a part of said file management area all the time in said cache memory, wherein said controlling step farther comprises:

comparing the contents of a plurality of said file management areas on said recording medium with each other to determine if the plurality of said file management areas have the same contents; and caching only one of said file management areas in said cache memory all the time if all the contents coincide.

5. The information recording/reproducing method according to claim 4, wherein said controlling step further comprises suspending caching of said file management areas if writing of said file management areas to specific addresses occurs.

6. The information recording/reproducing method according to claim 4, wherein said controlling step further comprises suspending caching of said file management areas if the capacity of said file management areas is not less than a predetermined capacity.

* * * * *